United States Patent [19]

Mizoguchi

[11] Patent Number: 5,132,892
[45] Date of Patent: Jul. 21, 1992

[54] PWM CONTROLLER USED IN A MULTIPLE INVERTER

[75] Inventor: Shoji Mizoguchi, Hyogo, Japan

[73] Assignee: Mitsubishi Denki Kabushiki Kaisha, Tokyo, Japan

[21] Appl. No.: 307,182

[22] Filed: Feb. 2, 1989

Related U.S. Application Data

[63] Continuation-in-part of Ser. No. 119,043, Nov. 10, 1987, abandoned.

[30] Foreign Application Priority Data

Nov. 12, 1986 [JP] Japan .................. 61-268928

[51] Int. Cl.⁵ .................. H02M 7/521; H02M 7/5387
[52] U.S. Cl. .......................... 363/41; 363/43; 363/72
[58] Field of Search ............ 363/42, 41, 43, 72; 318/811, 808

[56] References Cited

U.S. PATENT DOCUMENTS

| | | | |
|---|---|---|---|
| 3,638,094 | 1/1972 | Ve Nard | 363/72 |
| 4,063,143 | 12/1977 | Forstbauer | 363/43 |
| 4,167,775 | 9/1979 | Baker et al. | 363/43 |
| 4,447,786 | 5/1984 | Saar et al. | 318/811 |

FOREIGN PATENT DOCUMENTS

| | | | |
|---|---|---|---|
| 76181 | 5/1984 | Japan | 363/41 |
| 62-4950 | 2/1987 | Japan . | |

OTHER PUBLICATIONS

Institute of Electrical Engineers of Japan, "Technical Trend of Self Turn-Off Devices Application in Power Converting Facilities", Jan. 1984, p. 52.

Primary Examiner—William H. Beha, Jr.
Attorney, Agent, or Firm—Rothwell, Figg, Ernst & Kurz

[57] ABSTRACT

Disclosed is a controller which controls the a.c. (alternating current) on the basis of pulse-width modulation (PWM) for a multiple inverter which transforms d.c. power into high-voltage, high-capacity a.c. power with variable voltage and/or variable frequency. Several 3-phase inverter circuits connected through a transformer are used to form a polyphase mulitple inverter which produces the output voltage and current with synthesized voltage and current waveforms. The PWM controller produces multiple pulse trains within a half cycle of the a.c. output waveform and varies the equivalent voltage of pulses in a sinusoidal waveform, thereby obtaining a smooth output voltage and current waveforms. A plurality of 3-phase inverter main circuits connected to the d.c. power source have semiconductor switches, which are turned on or off integrally in PWM control mode in response to the on-off pulse signals provided by a single integral PWM signal generator, so that the instantaneous voltage variation is relatively small in the entire inverter output voltage range and the number of switching operations for the semiconductor switches is made minimal.

2 Claims, 11 Drawing Sheets

FIG. 5

| Sf | Su | Sv | Sw | Sx | Sy | Sz |
|----|----|----|----|----|----|----|
| 0  | 0  | 0  | 0  | 1  | 1  | 1  |
| 1  | 0  | 0  | 1  | 1  | 1  | 0  |
| 2  | 0  | 1  | 0  | 1  | 0  | 1  |
| 3  | 0  | 1  | 1  | 1  | 0  | 0  |
| 4  | 1  | 0  | 0  | 0  | 1  | 1  |
| 5  | 1  | 0  | 1  | 0  | 1  | 0  |
| 6  | 1  | 1  | 0  | 0  | 0  | 1  |
| 7  | 1  | 1  | 1  | 0  | 0  | 0  |

$Su = \overline{Sx}$
$Sv = \overline{Sy}$
$Sw = \overline{Sz}$

FIG. 6

| SfA | VuA    | VvA    | VwA    |
|-----|--------|--------|--------|
| 0   | 0      | 0      | 0      |
| 1   | 0      | −nVdc  | nVdc   |
| 2   | −nVdc  | nVdc   | 0      |
| 3   | −nVdc  | 0      | nVdc   |
| 4   | nVdc   | 0      | −nVdc  |
| 5   | nVdc   | −nVdc  | 0      |
| 6   | 0      | nVdc   | −nVdc  |
| 7   | 0      | 0      | 0      |

FIG. 7

| SfB | VuB  | VvB  | VwB  |
|-----|------|------|------|
| 0   | 0    | 0    | 0    |
| 1   | k    | −2k  | k    |
| 2   | −2k  | k    | k    |
| 3   | −k   | −k   | 2k   |
| 4   | k    | k    | −2k  |
| 5   | 2k   | −k   | −k   |
| 6   | −k   | 2k   | −k   |
| 7   | 0    | 0    | 0    |

WHERE $k = \dfrac{n}{\sqrt{3}} Vdc$ (SfA, SfB)

| $V_0$ | (0.0), (0.7), (7.0), (7.7) | | | | | | |
|---|---|---|---|---|---|---|---|
| $V_1$ | (4.0) (4.7) | $V_{13}$ | (4.5) | $V_{25}$ | (5.4) | $V_{37}$ | (6.1) |
| $V_2$ | (0.4) (7.4) | $V_{14}$ | (4.4) | $V_{26}$ | (6.5) | $V_{38}$ | (5.6) |
| $V_3$ | (6.0) (6.7) | $V_{15}$ | (6.4) | $V_{27}$ | (4.6) | $V_{39}$ | (2.5) |
| $V_4$ | (0.6) (7.6) | $V_{16}$ | (6.6) | $V_{28}$ | (2.4) | $V_{40}$ | (4.2) |
| $V_5$ | (2.0) (2.7) | $V_{17}$ | (2.6) | $V_{29}$ | (6.2) | $V_{41}$ | (3.4) |
| $V_6$ | (0.2) (7.2) | $V_{18}$ | (2.2) | $V_{30}$ | (3.6) | $V_{42}$ | (6.3) |
| $V_7$ | (3.0) (3.7) | $V_{19}$ | (3.2) | $V_{31}$ | (2.3) | $V_{43}$ | (1.6) |
| $V_8$ | (0.3) (7.3) | $V_{20}$ | (3.3) | $V_{32}$ | (1.2) | $V_{44}$ | (2.1) |
| $V_9$ | (1.0) (1.7) | $V_{21}$ | (1.3) | $V_{33}$ | (3.1) | $V_{45}$ | (5.2) |
| $V_{10}$ | (0.1) (7.1) | $V_{22}$ | (1.1) | $V_{34}$ | (5.3) | $V_{46}$ | (3.5) |
| $V_{11}$ | (5.0) (5.7) | $V_{23}$ | (5.1) | $V_{35}$ | (1.5) | $V_{47}$ | (4.3) |
| $V_{12}$ | (0.5) (7.5) | $V_{24}$ | (5.5) | $V_{36}$ | (4.1) | $V_{48}$ | (1.4) |

$\overline{oa} = \overline{ob} = 1$
$\overline{oc} = \overline{od} = \sqrt{3} - 1$
$\overline{oe} = \overline{of} = 2 - \sqrt{3}$
$\overline{oi} = \overline{oj} = (\sqrt{3}-1)/\sqrt{2}$ $\theta_0^*$ : 0 TO 360°
$\theta^*$ : 0 TO 360°
MODE : 0 TO 11 (FOR EVERY 30°)
fc : CARRIER FREQUENCY (=1/Ts)

5,132,892

PWM CONTROLLER USED IN A MULTIPLE INVERTER

This is a continuation-in-part of application Ser. No. 119,043, filed Nov. 10, 1987, now abandoned.

BACKGROUND OF THE INVENTION

1. Field of the Invention

The present invention relates to a controller for controlling a.c. (alternating current) power in a pulse-width modulation (PWM) fashion in a multiple inverter which transforms d.c. (direct current) power into high-voltage, high-capacity a.c. power with variable frequency and/or variable voltage. Particularly, the invention relates to a PWM controller for a multiple inverter circuit which produces the output voltage and current with synthesized voltage and current waveforms by use of several 3-phase inverter circuits connected through a transformer circuit for coupling inductively two electrical circuits, wherein the controller employs the PWM method in which several pulse trains are produced in a half cycle of the a.c. output waveform and the voltage in proportion to the pulse width is varied in a sinusoidal fashion so that a smooth a.c. output is produced and semiconductor switches in inverter main circuits are controlled for their on-off switching operations at the rising and falling edges of pulse signals formed in the pulse trains.

2. Description of the Prior Art

Recently, inverters using semiconductor switching devices such as transistors and thyristors are being used widely for the variable-speed drive control of a.c. motors such as squirrel-cage induction motors for example. At the same time, the recent advances in power electronics technology has enabled these inverters to deal with higher voltages and increased power capacities and made them applicable to power converting facilities with variable frequency and/or variable voltage capabilities.

Various novel techniques have been proposed recently also for controllers which operate in on-off mode semiconductor switches in the inverters. A most advanced controller for driving the gates of semiconductor switching devices is designed to produce multiple pulse trains within a half cycle of the output waveform, with each pulse having a pulse width varied so that the equivalent voltage expected of the pulse train has a sinusoidal waveform, and the gates of switching devices are controlled in PWM mode.

An example of the above-mentioned PWM controller intended for 12-phase PWM inverter multipled by multi-phase transformer is disclosed in the technical report (part II), No. 162, p. 52, entitled "Technical Trend of Self Turn-Off Devices Application in Power Converting Facilities", Institute of Electrical Engineers of Japan, published in January 1984. The arrangement of this PWM inverter circuit is illustrated in FIG. 1. The inverter circuit consists of a smoothing capacitor 1 for smoothing voltage supplied from a d.c. power source, 3-phase inverter main circuits 2 and 3 in parallel connection for converting the d.c. power into a.c. power, PWM pulse signal generators 4 and 5 for producing on-off pulse signals 6 and 7 which separately turn on or off switching devices (not shown) included in the 3-phase inverter main circuits, and a multiple transformer 8 which combines output voltages $V_a$ and $V_b$ of the inverter main circuits 2 and 3 to produce an output voltage V.

The operation of the above PWM inverter circuit will be described. An output voltage command $V^*$ and output frequency command $f^*$ are fed to the PWM pulse signal generators 4 and 5, which then produce on-off pulse signals 6 and 7, respectively, so that the fundamental waves of the output voltages $V_a$ and $V_b$ of the 3-phase inverter main circuits 2 and 3 have a 30° phase difference. These output voltages $V_a$ and $V_b$ are derived from the inverter input d.c. voltage $V_{dc}$, with their waveforms being pulse-width modulated. Their fundamental waves having a phase difference of 30° from each other are combined by the multiple transformer 8, resulting in the output voltage V. The output voltages $V_a$ and $V_b$ of the 3-phase inverter main circuits 2 and 3 have their fundamental waves $V_{af}$ and $V_{bf}$ summed by vectorial composition to become an output voltage fundamental $V_f$, as shown in the vectorial diagram of FIG. 2. The multiple transformer 8 is designed to have winding ratios so that the fifth and seventh harmonic voltage components are cancelled.

In the conventional PWM controller for the multiple inverter arranged as described above, individual inverters have independent switching operations, causing possibly the transformer output voltage to vary in steps from the peak voltage to the zero voltage when both inverters produce zero-voltage vectors simultaneously, as shown in FIG. 1. On this account, when this multiple inverter is used in applications dealing with a high voltage and large power capacity, the voltage step has an increased rate of change on the time axis (i.e., dv/dt), the load current includes increased harmonic ripple components, and a voltage surge is created in some cases, resulting in an adverse influence on devices and facilities at the load side.

The conventional PWM controller needs to have PWM pulse signal generators in which the phase difference of output fundamental waves is set to 30° in the case of 12-phase configuration, individually for each inverter, resulting in a complex and expensive overall system including the PWM controller and inverter main circuits.

Moreover, the inverter operating for a high output voltage causes a large variation in the output voltage under PWM control, creating a high voltage surge applied to the load, and creates an increased current ripple, making difficult the setting of a lower switching frequency for the PWM control for the switching devices in each inverter.

SUMMARY OF THE INVENTION

A primary object of the present invention is to provide a PWM controller of a multiple inverter, wherein PWM pulse signal generators are integrated in a unitary circuit with the intention of reducing the step variation of output voltage and reducing the load current ripple so as to lower the voltage surge in the load terminal voltage V.

A secondary object of this invention is to provide a multiple inverter which does not need as many PWM pulse signal generators as 3-phase inverters, thereby simplifying the structure and reducing the manufacturing cost of the power converting facility including the inverter main circuits.

A tertiary object of this invention, in concert with the primary object, is to provide a PWM controller of a multiple inverter, in which an instantaneous change in the output voltage is relatively small in the entire output voltage range and yet the switching operation can be minimized.

In order to achieve the above objectives, the inventive PWM controller of a multiple inverter is designed to have a single PWM pulse signal generator by which a combination of voltage vectors created at the output of the multiple transformer by the switching operation of the 3-phase inverter main circuits is supplied, and the output line voltage of the multiple transformer is made to have a minimal instantaneous variation and the combination of voltage vectors in implementing the PWM control is made selective so that the switching frequency of each inverter is minimum.

BRIEF DESCRIPTION OF THE DRAWINGS

FIG. 5 is a function table showing the switching function $S_f$ of one inverter main circuit in FIG. 3;

FIGS. 6 and 7 are function tables showing the relationship between the main circuit switching functions $S_{fA}$ and $S_{fB}$ of the 3-phase inverter main circuits shown in FIG. 3 and the output voltages of the 3-phase inverter main circuits included in the multiple transformer output phase voltages;

DETAILED DESCRIPTION OF THE PREFERRED EMBODIMENTS

Embodiments of the inventive PWM controller used in a multiple inverter will now be described in detail with reference to the drawings.

Figure 1:
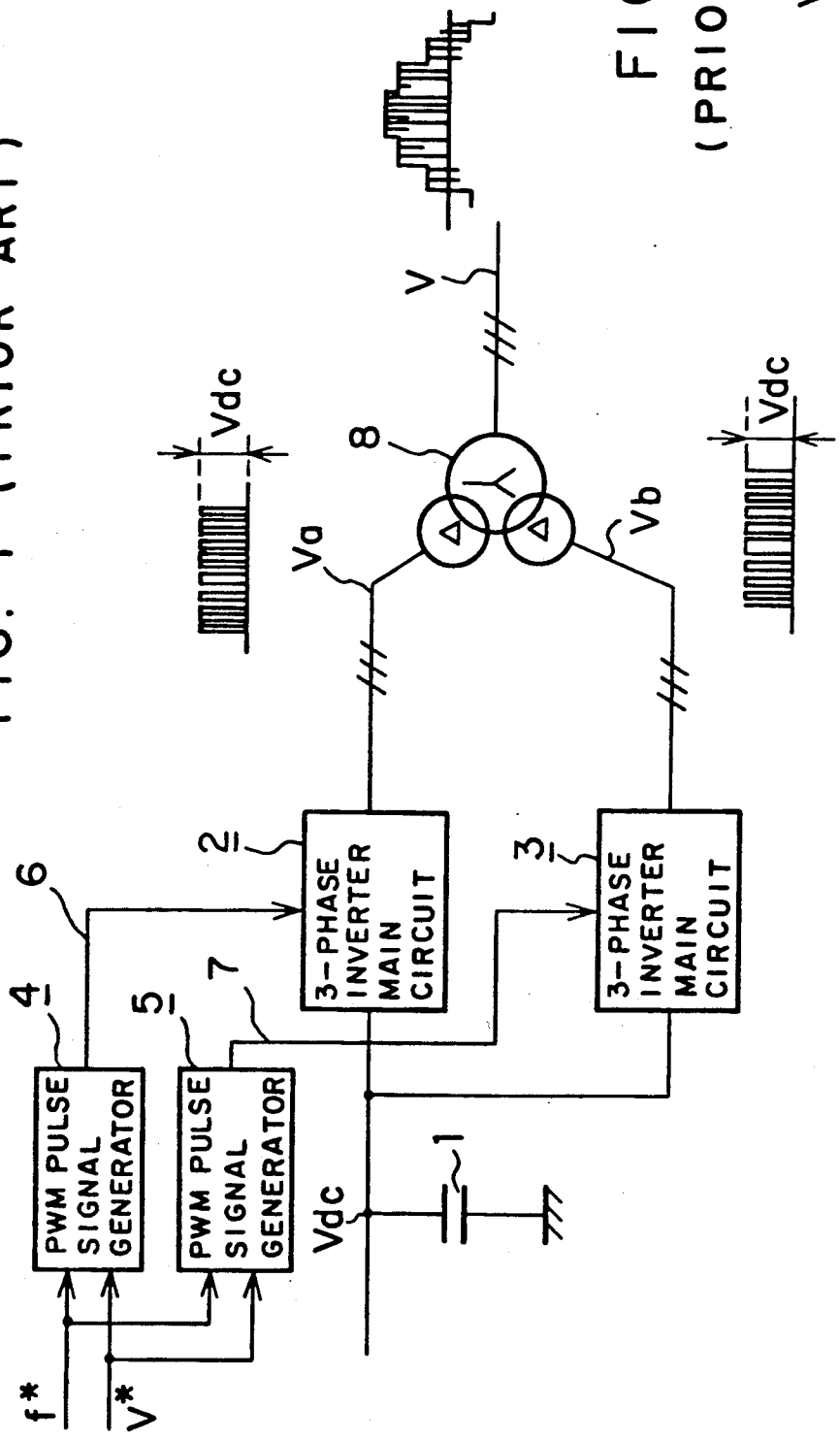
FIG. 1 is a block diagram of the conventional multiple inverter.
Figure 2:
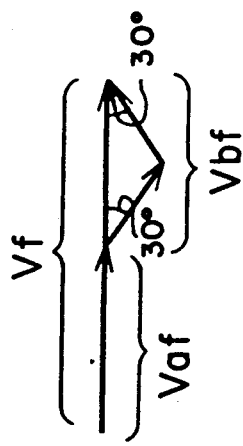
FIG. 2 is a vectorial diagram showing the fundamental wave of one phase of inverter output voltage combined by the multiple transformer shown in FIG. 1.
Figure 3:
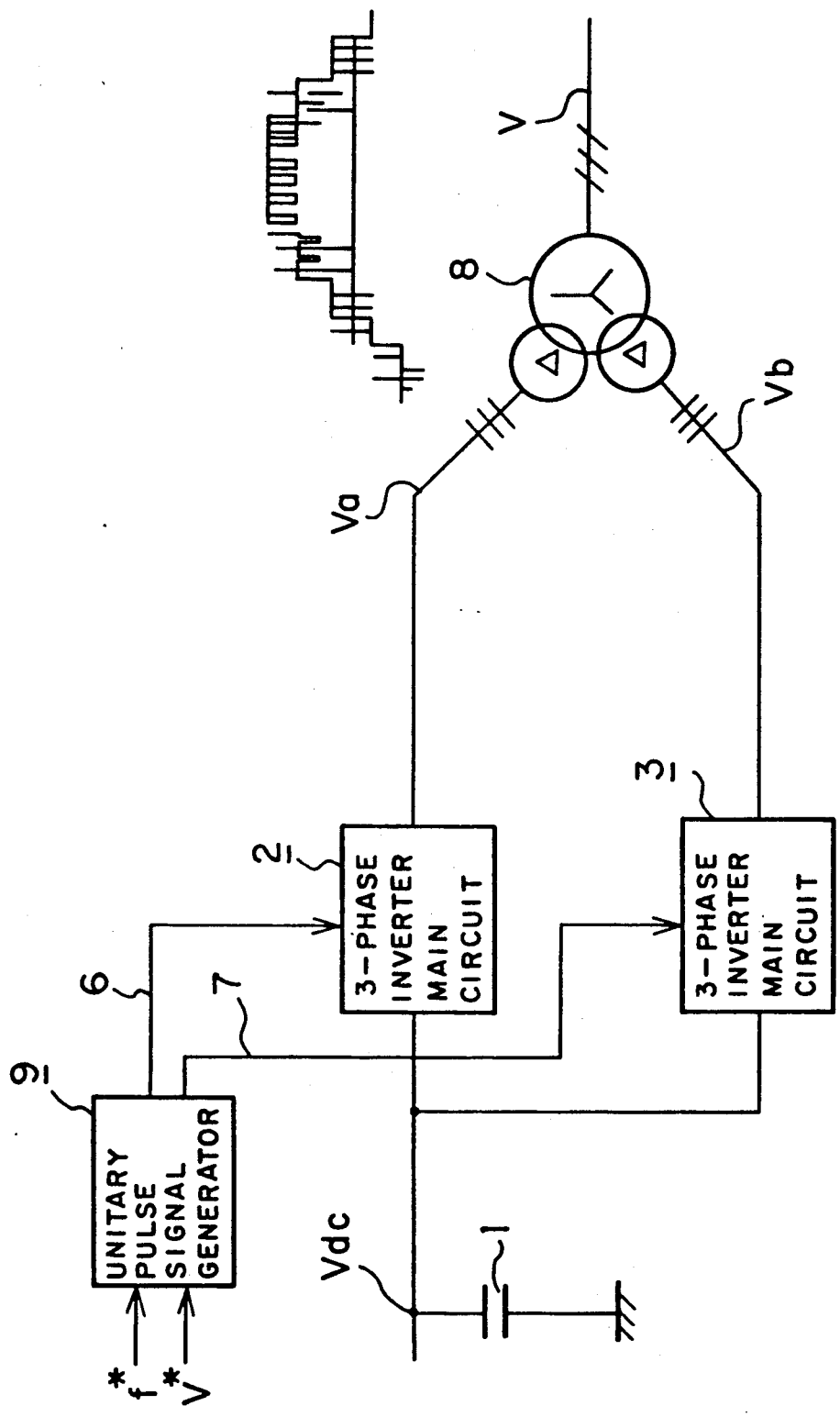
FIG. 3 is a block diagram showing the arrangement of the 12-phase multiple inverter controlled by the PWM controller embodying the present invention.
Figure 4:
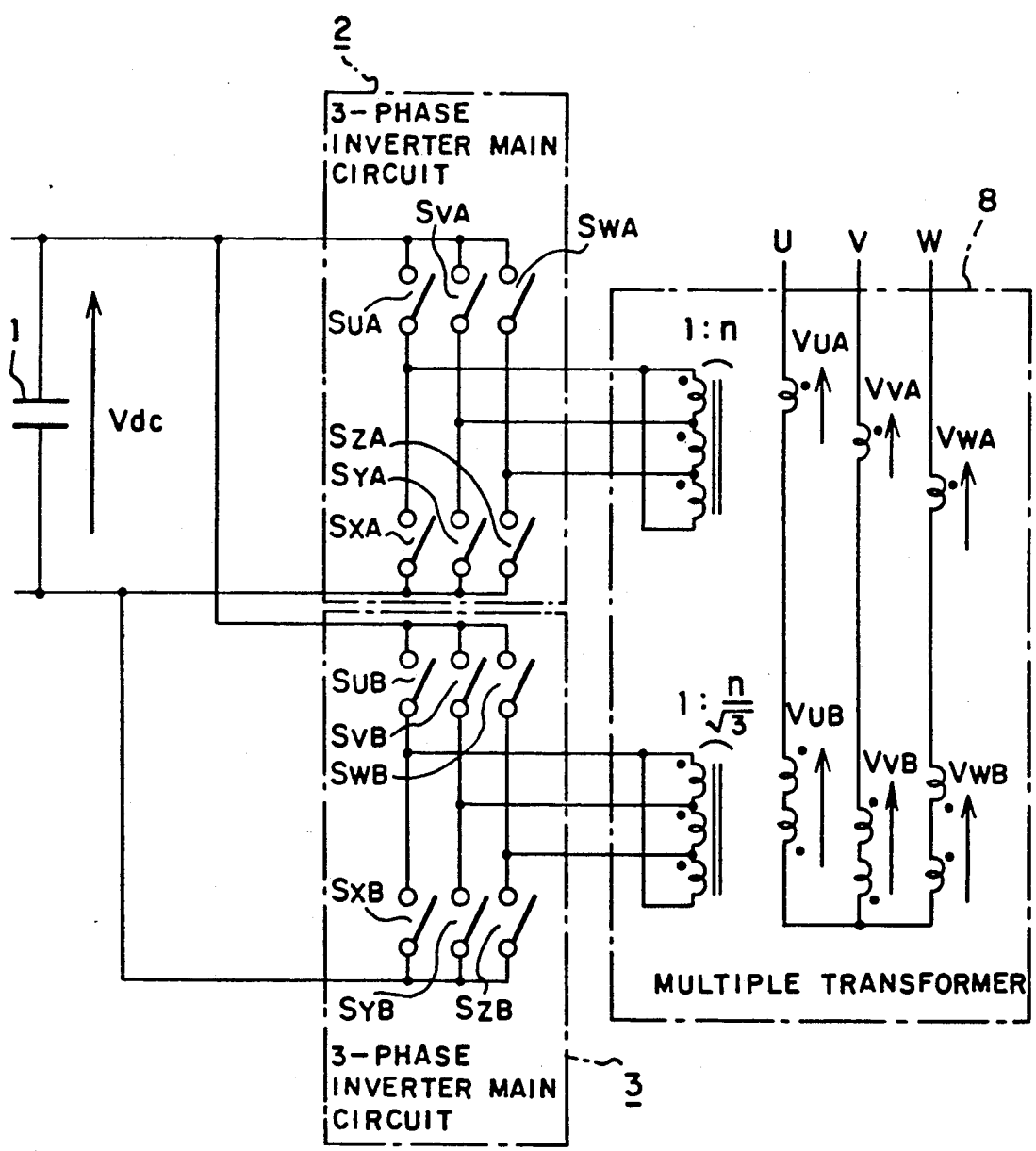
FIG. 4 is a schematic diagram of the inverter main circuits and multiple transformer in FIG. 3.

FIG. 3 shows in block diagram an embodiment of the present invention, in which the same or equivalent components to those in FIG. 1 are indicated by the common symbols. In the arrangement, 3-phase inverter main circuits 2 and 3 are connected with a unitary pulse signal generator 9 which provides on-off pulse signals 6 and 7. The pulse signal generator 9 has connections to receive an output voltage command V* and output frequency command f*. The detailed structure of the 3-phase inverter main circuits 2 and 3 and a multiple transformer 8 is shown in FIG. 4.

The 3-phase inverter main circuit 2 has switching devices $S_{UA}$, $S_{VA}$, $S_{WA}$, $S_{XA}$, $S_{YA}$ and $S_{ZA}$ each of which can be expressed by the symbol for a mechanical switch, while the 3-phase inverter main circuit 3 has identical switching devices $S_{UB}$, $S_{VB}$, $S_{WB}$, $S_{XB}$, $S_{YB}$ and $S_{ZB}$. Although there are provided free-wheeling diodes in the arrangement, they are not shown in FIG. 4 for simplicity purposes. The multiple transformer 8 is designed to have winding ratios of 1:n and 1:n/√3 and produce an output voltage of $V_{UA} \sim V_{WA}$ by being driven by the 3-phase inverter main circuit 2 and an output voltage of $V_{UB} \sim V_{WB}$ by being driven by another 3-phase inverter main circuit 3.

Next, the operation of the PWM controller arranged as described above will be described. Shown in FIG. 4 is an example of multiple transformer 8 of 12 phase, which requires two sets of 3-phase inverters. The output voltages $V_{UA} \sim V_{WA}$ and $V_{UB} \sim V_{WB}$ of the multiple transformer 8 driven by the 3-phase inverter main circuits 2 and 3 will first be discussed. With inverter switching devices $S_U$ through $S_Z$ being expressed for their on-state and off-state as "1" and "0", respectively, their states are expressed by the switching function $S_f$ as shown in the function table of FIG. 5. Namely, each inverter main circuit has eight kinds of switching function $S_f$. With the switching function $S_f$ of the 3-phase inverter main circuits 2 and 3 being termed $S_{fA}$ and $S_{fB}$, the output voltages $V_{UA} \sim V_{WA}$ and $V_{UB} \sim V_{WB}$ are in relations with the functions $S_{fA}$ and $S_{fB}$ as expressed in FIGS. 6 and 7.

Figure 8B:
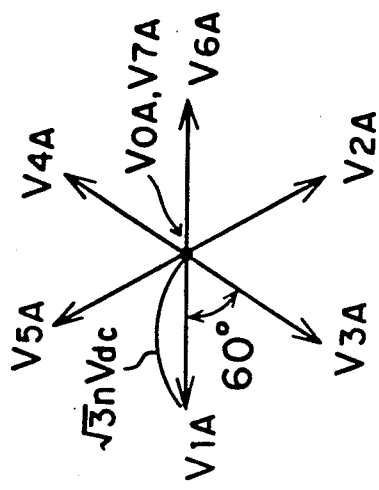
FIGS. 8B and 8C are instantaneous vectorial diagrams showing spatial voltage vectors generated on the multiple transformer output windings when both inverters are in switching states $S_{fA}$ and $S_{fB}$.
Figure 8C:
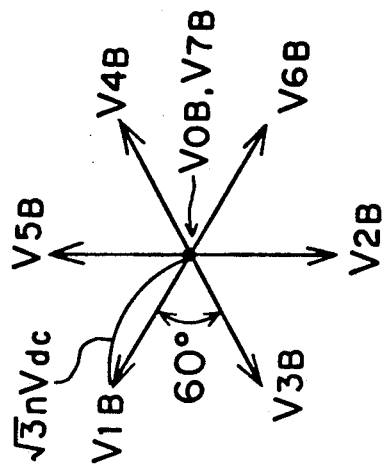
Figure 8A:
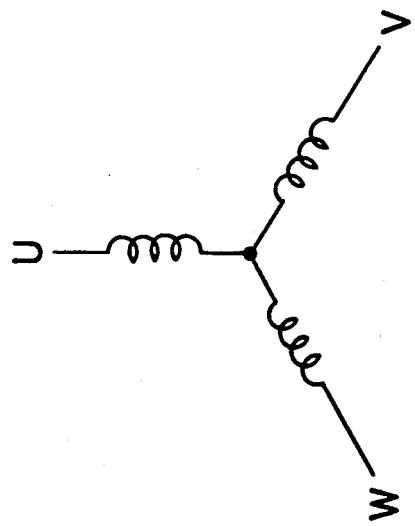
FIG. 8A is a diagram showing the output windings of the multiple transformer.

From the function tables obtained, the spatial voltage vectors formed by voltages produced on the output windings of the multiple transformer 8 are as shown in FIGS. 8B and 8C. In the figures, with respect to instantaneous voltage vectors $V_{nA}$ and $V_{nB}$ the suffix n (where n=0 to 7) represent the switching function of both inverters, suffixes A and B indicate the voltages of the 3-phase inverter main circuits 2 and 3, respectively.

Figure 9:
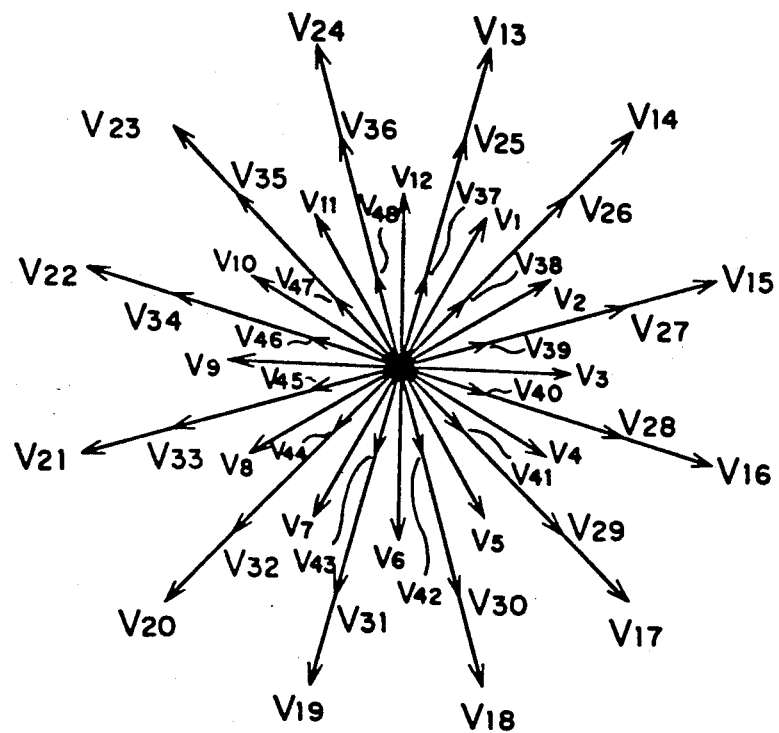
FIG. 9A is an instantaneous vectorial diagram showing the total voltage vectors which can be generated at the transformer output.
FIG. 9B is a table showing the combination of inverter switching states $S_{fA}$ and $S_{fB}$ necessary for generating the above voltage vectors.

When the outputs of the two 3-phase inverter main circuits 2 and 3 are combined, the multiple transformer 8 has instantaneous output voltage vectors as expressed in FIG. 9A, and 49 kinds of instantaneous output voltage vectors $\psi 0 \sim \psi 48$ as shown in FIG. 9B are usable. The 3-phase inverter main circuits 2 and 3 at time points of instantaneous voltage vector generation have inverter switching states expressed in the form of switching functions ($S_{fA}$, $S_{fB}$).

Figure 10:
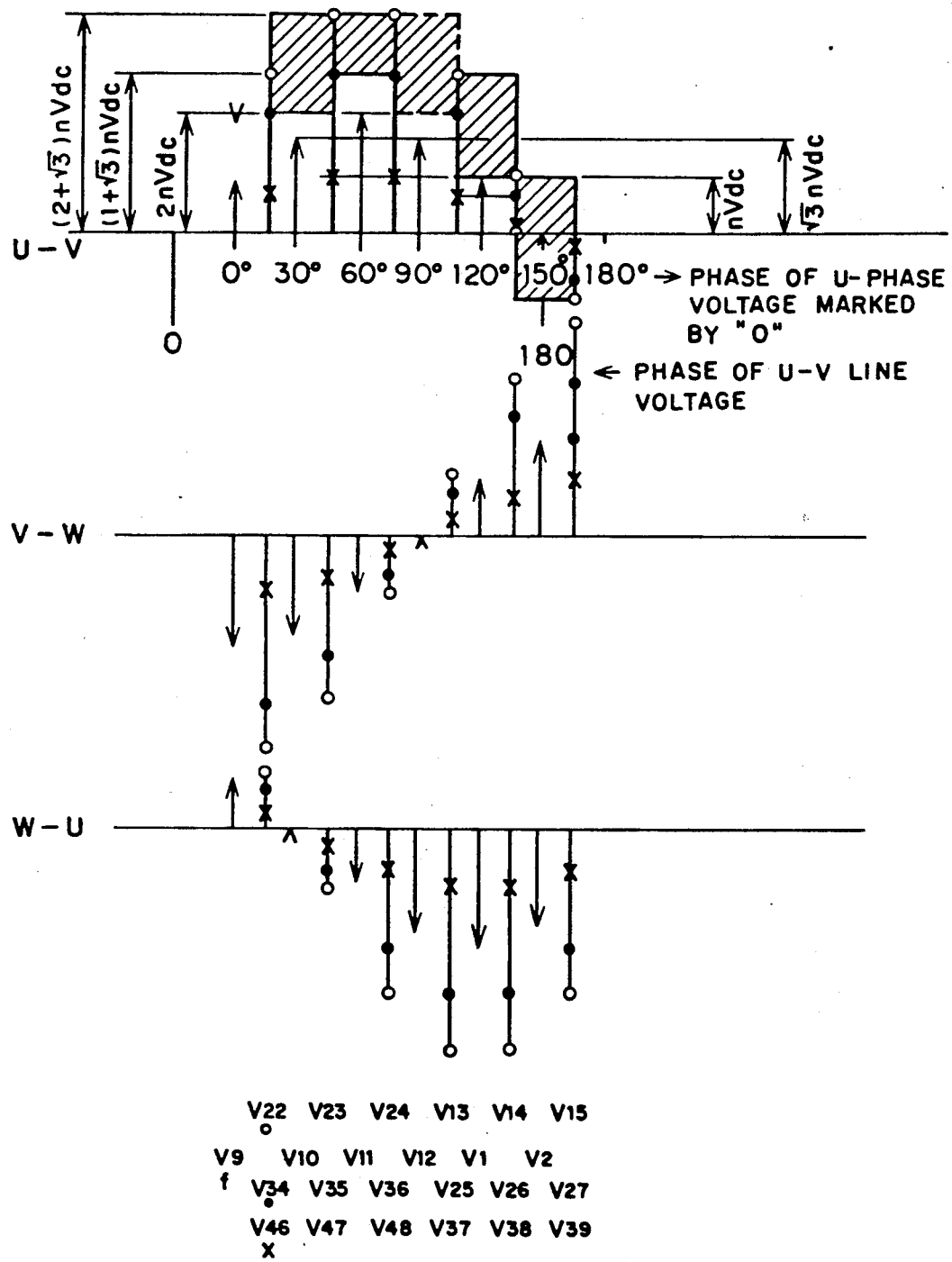
FIG. 10 is a vectorial diagram showing the instantaneous voltage values in about a half cycle period appearing between the output lines of the multiple transformer.

FIG. 10 shows in detail a half cycle period of the instantaneous output voltage values on the multiple transformer 8 at respective voltage vector generation.

Figure 11:
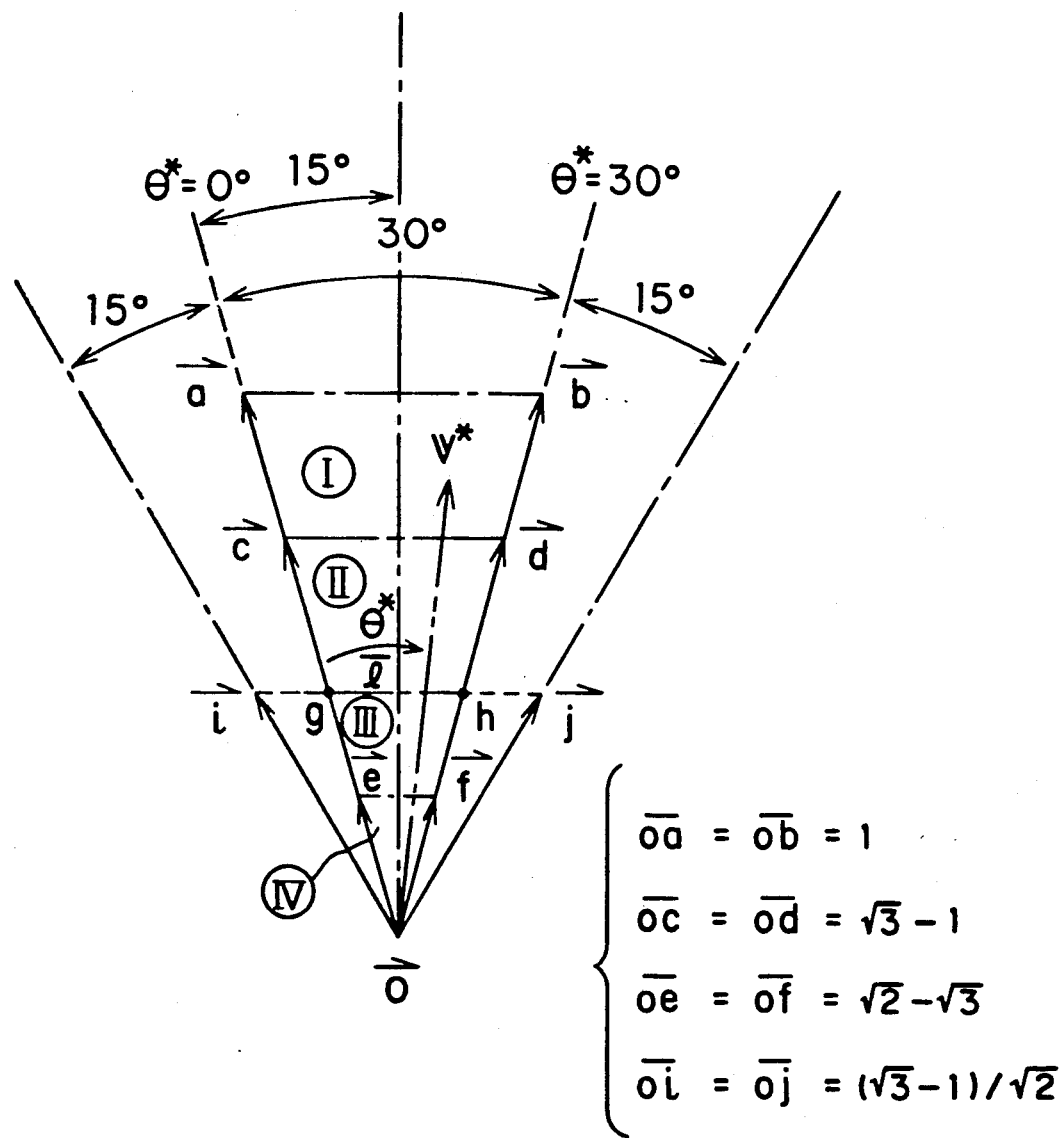
FIGS. 11, 12A and 12B are vectorial diagrams derived from FIG. 9A, in which voltage vectors are confined for standardization to have a 60° difference.

In PWM control of the constant period carrier system, by adjusting properly the combination of instantaneous voltage vectors in the carrier period with a period of $T_s$ and the voltage vector generation time ratio $T_n/T_s$ (where n is equal in value to n of $\nu_n$), it becomes possible to generate a voltage having an intended phase $\theta^*$ and peak value $|\nu^*|$ in average. There are various combinations of instantaneous voltage vectors, and in this case a voltage vector selected by pulse width modulation for the instantaneous line voltage at the output of the multiple transformer 8 is used to generate the average voltage vector having the intended peak value $|\nu^*|$ and phase $\theta^*$ as a criterion. Among the combinations of the peak value $|\nu^*|$ and phase $\theta^*$ of the voltage vectors, the condition for minimizing the step variation at a change of instantaneous voltage vectors is to be found. As shown in FIGS. 9A, 9B and 10, the combination of voltage vectors under this criterion resides within regions of phase $\theta^*$ at a 30° interval, resulting in a region separation between the phase $\theta^*$ and peak value $|\nu^*|$ as shown in FIG. 11. In the Figure, the number of region divisions increases, imposing problems in practice, and the use of $\bar{l}$ is abandoned here. In FIG. 11, $\bar{a}$ and $\bar{b}$ correspond to peak values $\nu_{13} \sim \nu_{24}$ in FIG. 9A, and similarly $\bar{c}$ and $\bar{d}$ correspond to $\nu_{25} \sim \nu_{36}$, $\bar{e}$ and $\bar{f}$ correspond to $\nu_{37} \sim \nu_{48}$, $\bar{i}$ and $\bar{j}$ correspond to $\nu_1 \sim \nu_{12}$, and $\bar{o}$ corresponds to $o$, through standardization with line $\overline{oa} = 1$.

In FIG. 11, in case the peak value $|\nu^*|$ resides in the region (region I) enclosed by a, b, c and d, the combination includes voltage vectors $\bar{a}, \bar{b}, \bar{c}$ and $\bar{d}$, and similarly in case the peak value $|\nu^*|$ resides in the region (region II) enclosed by c, d, g and h, the combination includes $\bar{c}, \bar{d}, \bar{i}$ and $\bar{j}$, in case the peak value $|\nu^*|$ resides in the region (region III) enclosed by g, h, e and f, the combination includes $\bar{i}, \bar{j}, \bar{e}$ and $\bar{f}$, and in case the peak value $|\nu^*|$ resides in the region (region IV) enclosed by e, f and o, the combination includes voltage vectors $\bar{e}, \bar{f}$ and $\bar{o}$ to practice PWM.

The following describes PWM in region I as an example. Initially, regions I and II are discriminated basing on equations (1) through (8) to find that the peak value $|\nu^*|$ resides in region I.

$$1 \geq K > \frac{1}{\sqrt{2}} \cdot \frac{1}{\cos(15° - \theta^*)} \quad (1)$$

where $$K = \frac{|V^*|}{V_{max}},$$

$$V_{max} = (2 + \sqrt{3}) nVdc$$

Assuming that the voltage vectors $\bar{a}, \bar{b}, \bar{c}$ and $\bar{d}$ are generated at times $T_a, T_b, T_c$ and $T_d$, respectively, $$T_a + T_b + T_c + T_d = T_s \quad (2)$$

Namely, the voltage vectors $\bar{a}, \bar{b}, \bar{c}$ and $\bar{d}$ are switched during the carrier period $T_s$. The method of switching is arbitrary, and that of minimal switching operations will be chosen.

$$\left.\begin{array}{l} \frac{1}{T_s}(T_a + T_b) = K_1 \\ \frac{1}{T_s}(T_c + T_d) = K_2 \\ K_1 + K_2 = 1 \end{array}\right\} \quad (3)$$

$$K\cos(15° - \theta) = \left(K_1 + \frac{2}{1 + \sqrt{3}} K_2\right)\cos 15° \quad (4)$$

From equations (3) and (4), $$K_1 = \frac{1 + \sqrt{3}}{1 - \sqrt{3}}\left\{\frac{2}{1 + \sqrt{3}} - K\frac{\cos(15° - \theta^*)}{\cos 15°}\right\} \quad (5)$$

$$K_2 = \frac{1 + \sqrt{3}}{1 - \sqrt{3}}\left\{K\frac{\cos(15° - \theta^*)}{\cos 15°} - 1\right\} \quad (6)$$

The following condition of equation (7) is substituted in equations (5) and (6).

$$\frac{T_a}{T_b} = \frac{T_c}{T_d} = \frac{\sin(30° - \theta^*)}{\sin\theta^*} \quad (7)$$

$$\begin{cases} \left(\frac{T_a}{T_s}\right) = K_1 \cdot \frac{\sin(30° - \theta^*)}{\sin\theta^* + \sin(30° - \theta^*)} \\ \left(\frac{T_b}{T_s}\right) = \frac{\sin\theta^*}{\sin(30° - \theta^*)} \cdot \left(\frac{T_a}{T_s}\right) \\ \left(\frac{T_c}{T_s}\right) = K_2 \cdot \frac{\sin(30° - \theta^*)}{\sin\theta^* + \sin(30° - \theta^*)} \\ \left(\frac{T_d}{T_s}\right) = \frac{\sin\theta^*}{\sin(30° - \theta^*)} \cdot \left(\frac{T_c}{T_s}\right) \end{cases} \quad (8)$$

The carrier period $T_s$ is divided into four sections based on equation (8) to switch the voltage vectors, and unified PWM control for the 3-phase inverter main circuits 2 and 3 shown in FIG. 3 can be carried out.

The next step is to find the condition of minimizing the step variation at a change of voltage vectors and minimizing the number of switching operations among the combinations of voltage vectors selected by PWM for the instantaneous line voltage at the output of the multiple transformer 8 in generating an average voltage vector having the intended peak value $|\nu^*|$ and phase $\theta^*$ as a criterion. FIG. 13 shows the number of switching operations in the whole inverter at a change of voltage vectors. From FIGS. 9, 10 and 13, the combination of voltage vectors under this criterion is confined in regions of phase $\theta^*$ at a 30° interval, resulting in a region separation for the phase $\theta^*$ and peak value $|\nu^*|$ as shown in FIG. 12.

In order to minimize the instantaneous variation of the output voltage at voltage vector switching by PWM, FIGS. 10 and 13 (use of $\bar{l}$ is out of consideration because of too many regions in practice) imply division into four regions ($\bar{a}, \bar{b}, \bar{d}, \bar{c}$), ($\bar{c}, \bar{d}, \bar{j}, \bar{i}$), (g, h, $\bar{f}, \bar{e}$) and ($\bar{e}, \bar{f}, \bar{o}$). Among these, region (e, f, o) is too low in criterion in a sense of switching, and it is more desirable to implement PWM for the region enclosed by g, h and o with $\bar{i}$, $\bar{j}$ and $\bar{o}$. In FIG. 12, $\bar{a}$ and $\bar{b}$ correspond to $\vee_{13}\sim\vee_{24}$ in FIG. 9, $\bar{c}$ and $\bar{d}$ correspond to $\vee_{25}\sim\vee_{35}$, $\bar{e}$ and $\bar{f}$ correspond to $\vee_{37}\sim\vee_{48}$, $\bar{i}$ and $\bar{j}$ correspond to $\vee_1\sim\vee_{12}$, and $\bar{o}$ corresponds to $\vee_0$, through standardization with line $\overline{oa}=1$.

Figures 12A, 12B:
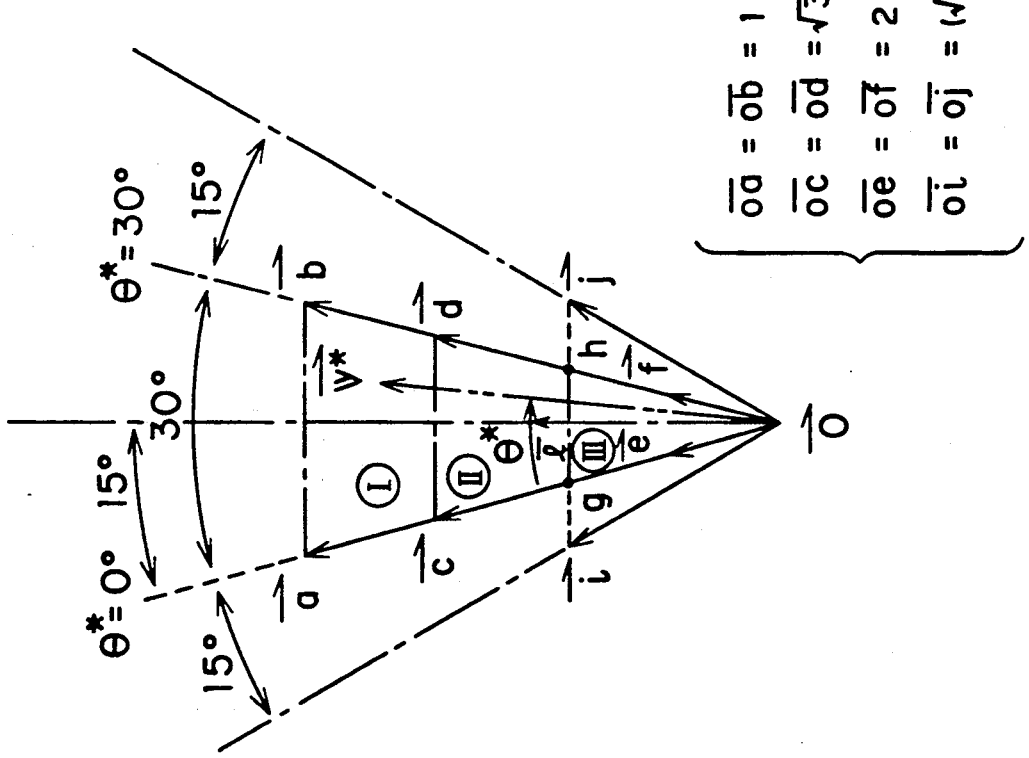
Figure 13:
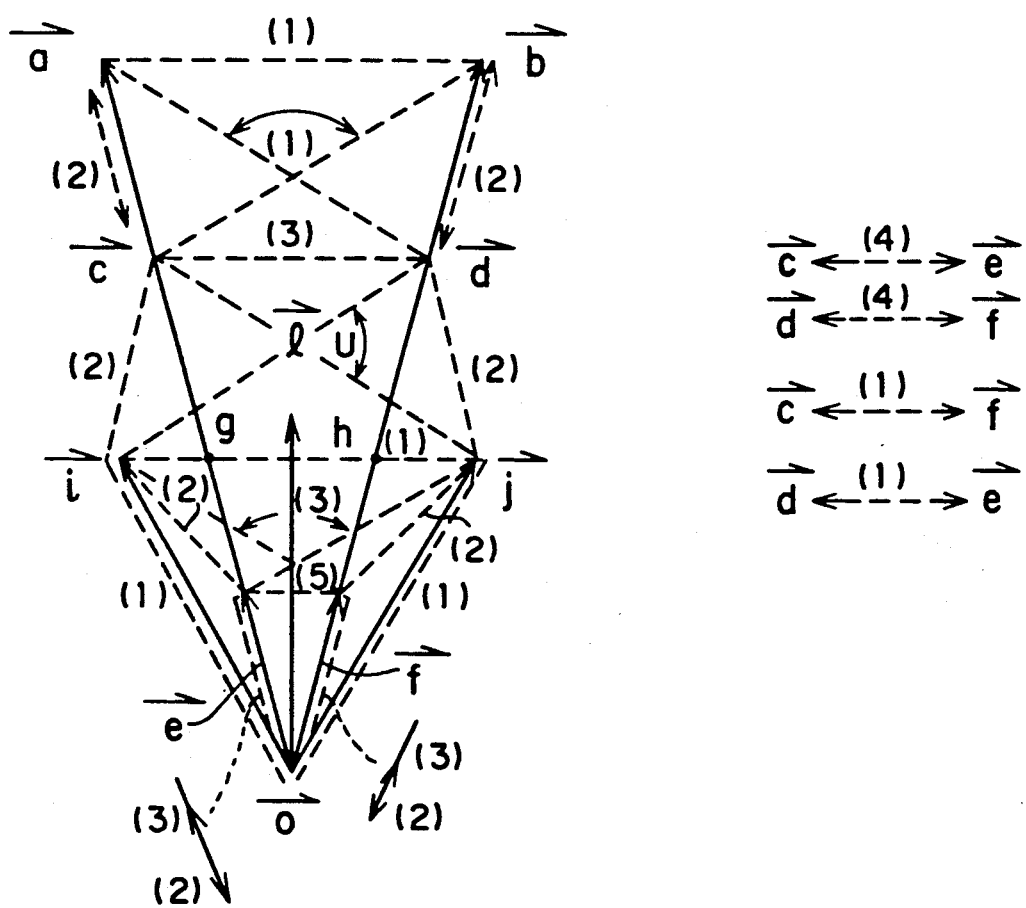
FIG. 13 is a diagram derived from FIG. 9A, in which voltage vectors are confined to have a 60° difference, also showing the number of switching operations in the whole inverter at a transition between voltage vectors.

In FIG. 12, in case the output voltage vector command value $V^*$ resides in the region (region I) enclosed by $\bar{a}$, $\bar{b}$, $\bar{c}$ and $\bar{d}$, the combination includes voltage vectors $\bar{a}$, $\bar{b}$, $\bar{c}$ and $\bar{d}$, in case the peak value $V^*$ resides in the region (region II) enclosed by $\bar{c}$, $\bar{d}$, $\bar{g}$ and $\bar{h}$, the combination includes voltage vectors $\bar{c}$, $\bar{d}$, $\bar{i}$ and $\bar{j}$, and in case of region (region III) enclosed by $\bar{g}$, $\bar{h}$ and $\bar{o}$, the combination includes voltage vectors $\bar{i}$, $\bar{j}$ and $\bar{o}$ in practicing PWM.

PWM divides the carrier period $T_s$ by the generation time ratio of instantaneous voltage vectors used, and the instantaneous voltage vector generation time is determined such that the peak values $|V^*|$ of desired output voltage vector are generated evenly in the period $T_s$. Namely, for the region I in FIG. 12, the vector generation time for $\bar{a}$, $\bar{b}$, $\bar{c}$ and $\bar{d}$ is made to be $T_a$, $T_b$, $T_c$ and $T_d$, respectively, and these are determined to meet the following equations.

$$\left(\frac{T_a}{T_s}\right)+\left(\frac{T_b}{T_s}\right)+\left(\frac{T_c}{T_s}\right)+\left(\frac{T_d}{T_s}\right)=1 \tag{9}$$

$$a\cdot\left(\frac{T_a}{T_s}\right)+b\cdot\left(\frac{T_b}{T_s}\right)+c\cdot\left(\frac{T_c}{T_s}\right)+d\cdot\left(\frac{T_d}{T_s}\right)=V^* \tag{10}$$

The following describes the relation among the peak value $|V^*|$, phase $\theta^*$ and each voltage vector generation time for each region.

Region I $$K=|V^*|/V_{max} \tag{11}$$

where $V_{max}$ is a voltage at the generation of $\bar{a}$ in FIG. 12.

$$\therefore 0 \leq K \leq 1$$

$$\begin{cases} a = e^{j0^\circ} = 1 \\ b = e^{-j30^\circ} = \frac{\sqrt{3}}{2} - j\frac{1}{2} \\ c = (\sqrt{3}-1)e^{j0^\circ} = (\sqrt{3}-1) \\ d = (\sqrt{3}-1)e^{-j30^\circ} = (\sqrt{3}-1)\left(\frac{\sqrt{3}}{2}-j\frac{1}{2}\right) \end{cases} \tag{12}$$

$$\frac{V^*}{V_{max}} = Ke^{-j\theta^*} = K(\cos\theta^* - j\sin\theta^*) \tag{13}$$

From the above equations (10), (12) and (13), $$\frac{1}{T_s}\left(T_a + \frac{\sqrt{3}}{2}T_b + (\sqrt{3}-1)T_c + \frac{\sqrt{3}}{2} \times (\sqrt{3}-1)T_d\right) = K\cos\theta^* \tag{14}$$

$$\frac{1}{T_s}\left(\frac{1}{2}T_b + \frac{1}{2}(\sqrt{3}-1)T_d\right) = K\sin\theta^* \tag{15}$$

The condition of the case where the peak value $V^*$ moves on $\overline{ab}$ and $\overline{cd}$ in FIG. 12. is:

$$\begin{cases} \left(\frac{T_a}{T_s}\right) = \frac{\sin(30^\circ - \theta^*)}{\sin\theta^*}\left(\frac{T_b}{T_s}\right) \tag{16} \\ \left(\frac{T_c}{T_s}\right) = \frac{\sin(30^\circ - \theta^*)}{\sin\theta^*}\left(\frac{T_d}{T_s}\right) \tag{17} \end{cases}$$

From equations (9), (14), (15) and (16) or (17), the following result is reached.

$$K_1 = \left(\frac{T_a}{T_s}\right)+\left(\frac{T_b}{T_s}\right)=\frac{1+\sqrt{3}}{1-\sqrt{3}} \times \left(\frac{2}{1+\sqrt{3}} - K\frac{\cos(15^\circ - \theta)}{\cos 15^\circ}\right) \tag{18}$$

$$K_2 = \left(\frac{T_c}{T_s}\right)+\left(\frac{T_d}{T_s}\right) = 1 - K_1 \tag{19}$$

$$K_3 = \frac{\sin\theta^*}{\sin\theta^* + \sin(30^\circ - \theta^*)} \tag{20}$$

$$\begin{cases} \left(\frac{T_a}{T_s}\right) = K_1 \cdot K_3 \tag{21} \\ \left(\frac{T_b}{T_s}\right) = \frac{\sin\theta^*}{\sin(30^\circ - \theta^*)}\left(\frac{T_a}{T_s}\right) \tag{22} \\ \left(\frac{T_c}{T_s}\right) = K_2 \cdot K_3 \tag{23} \\ \left(\frac{T_d}{T_s}\right) = \frac{\sin\theta^*}{\sin(30^\circ - \theta^*)}\left(\frac{T_c}{T_s}\right) \tag{24} \end{cases}$$

With $K_2 = 0$) for the case of $K_2 \leq 0$, $T_a/T_s$ and $T_b/T_s$ are calculated. The region K has a range:

$$\frac{1}{\sqrt{2}} \cdot \frac{1}{\cos(15^\circ - \theta^*)} < K \leq 1 \tag{25}$$

The sequence of voltage vector generation with minimal switching is from $\bar{a}$ to $\bar{d}$ to $\bar{b}$ to $\bar{c}$.

Region II similar to the case of region I, for the vectors $\bar{c}$, $\bar{d}$, $\bar{i}$ and $\bar{j}$ generated at $T_c$, $T_d$, $T_i$ and $T_j$, respectively, $$\left(\frac{T_c}{T_s}\right)+\left(\frac{T_d}{T_s}\right)+\left(\frac{T_i}{T_s}\right)+\left(\frac{T_j}{T_s}\right)=1 \tag{26}$$

-continued $$\left(\frac{T_i}{T_s}\right) = \frac{\{2\sqrt{2}\sin 15° - 2K\{\sin(30° - \theta^*) + \sin\theta^*\}\} \cdot \sin(45° - \theta)}{\sin(\theta^* + 15°) - 2\sqrt{3}\sin 15°\sin\theta^*} \quad (27)$$

$$\left(\frac{T_j}{T_s}\right) = \frac{\sin(\theta^* + 15°)}{\sin(45° - \theta^*)} \cdot \left(\frac{T_i}{T_s}\right) \quad (28)$$

$$\left(\frac{T_c}{T_s}\right) = \frac{\sin(30° - \theta^*)}{\sin(30° - \theta^*) + \sin\theta^*} - \frac{\sin(30° - \theta^*)\{\sin(45° - \theta^*) + \sin(\theta^* + 15°)\}}{\sin(45° - \theta^*)\{\sin(30° - \theta^*) + \sin\theta^*\}} \left(\frac{T_i}{T_s}\right) \quad (29)$$

$$\left(\frac{T_d}{T_s}\right) = \frac{\sin\theta^*}{\sin(30° - \theta^*)} \cdot \left(\frac{T_c}{T_s}\right) \quad (30)$$

The range of K is:

$$\frac{\sqrt{3}}{2 + \sqrt{3}} \cdot \frac{\cos 15°}{\cos(15° - \theta^*)} < K \leq \frac{1}{\sqrt{2}} \cdot \frac{1}{\cos(15° - \theta^*)} \quad (31)$$

The minimal switching is achieved by $\bar{c}$ to $\bar{j}$ to $\bar{d}$ to $\bar{i}$. (As will be appreciated from FIG. 9B, there are two sets of switching for $\bar{i}$ and $\bar{j}$, and one with the smaller number of switching operations is chosen.)

Region III

For vectors $\bar{i}$, $\bar{j}$ and $\bar{o}$ generated at $T_i$, $T_j$ and $T_o$, respectively, $$\left(\frac{T_i}{T_s}\right) + \left(\frac{T_j}{T_s}\right) + \left(\frac{T_o}{T_s}\right) = 1 \quad (32)$$

$$\left(\frac{T_i}{T_s}\right) = \sqrt{\frac{2}{3}}\,(1 + \sqrt{3}) \cdot K \cdot \sin(\theta^* + 135°) \quad (33)$$

$$\left(\frac{T_j}{T_s}\right) = \sqrt{\frac{2}{3}}\,(1 + \sqrt{3}) \cdot K \cdot \sin(\theta^* + 15°) \quad (34)$$

$$\left(\frac{T_o}{T_s}\right) = 1 - \sqrt{\frac{2}{3}}\,(1 + \sqrt{3}) \cdot K \cdot \cos(15° - \theta^*) \quad (35)$$

The range of K is $$0 \leq K \leq \frac{\sqrt{3}}{2 + \sqrt{3}} \cdot \frac{\cos 15°}{\cos(15° - \theta^*)} \quad (36)$$

Vector $\bar{o}$ has four kinds of switching as shown in FIG. 9B (equivalent to $v_o$), while $\bar{i}$ and $\bar{j}$ have two kinds of switching, and the combination with a smaller number of switching operations is chosen.

As described above, region discrimination is implemented basing on the peak value $|v^*|$ and phase $\theta^*$ of the intended voltage vector command in accordance with equations (25), (30) and (36) so as to reveal the voltage vector generation time for each region, and the PWM pulse is generated in response to the switching functions $S_{fA}$ and $S_{fB}$ of each inverter shown in FIG. 9B which generate the voltage vectors at the resulting vector generation time.

Figure 14A:
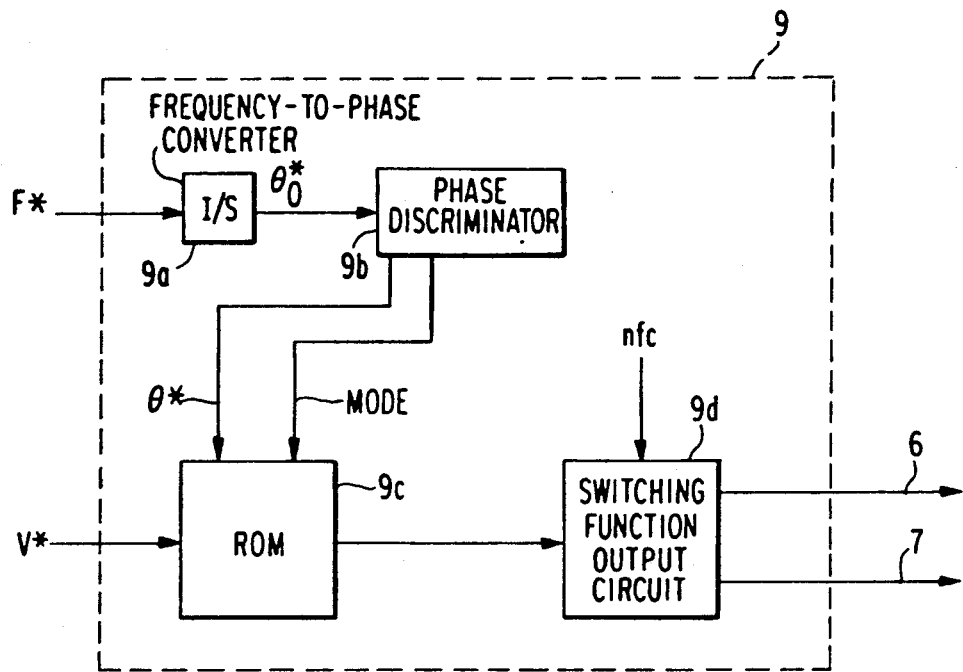
FIG. 14A is a detailed block diagram of an embodiment of the unitary pulse signal generator 9 of FIG. 3.

A PWM pulse signal generator 9 for a multi-phase inverter of the present invention can be constituted as one example shown in FIG. 14A.

Figure 14B:
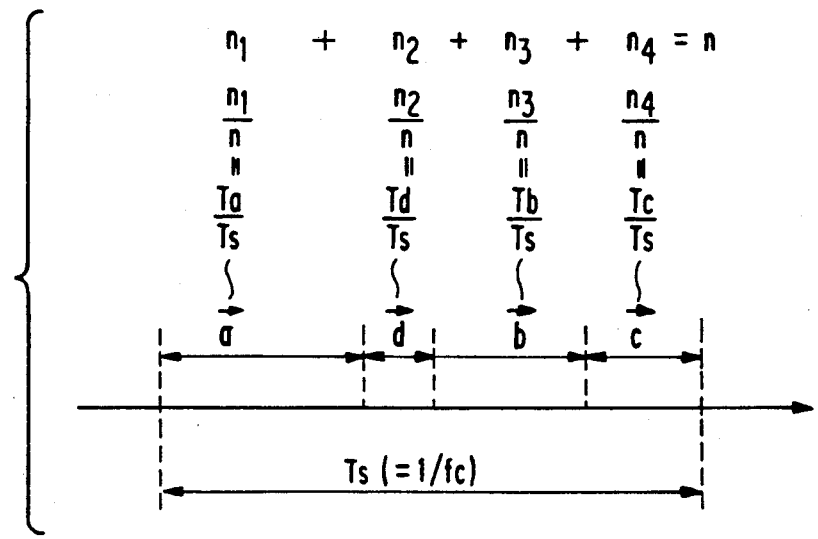
FIG. 14B is a chart illustrating the generation of instantaneous voltage vectors during a period Ts of a carrier.

An oscillating frequency reference value F* and an output voltage reference value V* are inputted from an external source, the value F* is converted into a phase signal $\theta^*$ by a frequency-to-phase converter 9a and a MODE is generated in which a phase $\theta^*$ for each 30° of 12 phases and 360° of 0 to 11 divided into 12 segments for every 30° are divided by the phase discriminator 9b. Switching functions (FIG. 9A and FIG. 9B) for generating a voltage vector for every Mode in which the value V* is calculated in advance by the equations (11), (18) to (25), (27) to (31), (33) to (36) in reference to $\theta^*$ and the MODE are stored in ROM 9c and a series of data are outputted in an output period Ts in sequence for switching function output device 9d. In the switching function output device 9d, this series of data are latched, the switching function values are outputted in sequence and determined as shown in FIG. 14B simultaneously with a starting of the next output period Ts, and the switching signals 6 and 7 of each of the inverter devices are generated. In 9d of FIG. 14A, a clock nfc is used for timing, and a time data stored in ROM 9c is stored as data in which Ts is equally divided into n-segments. Although there are various ways of constituting 9d, as one example, latched data is digitally compared to determine a generating time ratio in the period Ts for each switching function. The constitution shown in FIG. 14A is suitable for S/W processing utilizing a microprocessor, in which available S/W processing is performed to enable a reduction of H/W, improving reliability and exhibiting a reduction in cost.

In case that a time distribution supervising digital comparator or its equivalent system is used for 9d, the switching function for generating each of the voltage vectors is not stored in ROM 9c but it may be arranged as a separate ROM in the later stage of the comparator. In addition, the value fc generating a clock nfc of FIG. 14A, i.e., an output period Ts in FIG. 14B may not be varied with the inverter output reference wave frequency of the present invention, but it may be kept constant.

Although the above embodiment has been described for the PWM system of a multiple inverter with a 12-phase transformer, the same effectiveness will result when applied to inverters of 18-phase, 24-phase and the like.

According to the present invention, as described above, the circuit is configured so that a multiple inverter multipled by multi-phase transformer has its PWM determined together for all inverters and the variation of the instantaneous output line voltage and the number of switching operations are minimized, whereby the PWM section is made compact and inexpensive. This allows a multiple inverter with smaller output voltage surge and load current ripple, and also allows the whole-region PWM for devices such as GTOs which cannot have a large number of switching operations, whereby switching loss can be reduced.

What is claimed is:

1. A pulse-width modulation (PWM) controller for a multiple inverter which synthesizes pulse-width modulated 3-phase a.c. power from a source of d.c. power, comprising:

a PWM pulse signal generator for generating switching signals for controlling a plurality of 3-phase inverter main circuits coupled to said d.c. power source, including, means for receiving a frequency reference value and an output voltage reference value from a reference source, means for storing a plurality of predetermined switching functions each corresponding to particular frequency and output voltage reference values, means for outputting a specific sequence of switching functions from said storing means in response to a received frequency reference value and output voltage reference value, and switching signal output means responsive to said sequence of switching functions for outputting said switching signals to said plurality of 3-phase inverter main circuits representing a desired instantaneous voltage vector for each of a plurality of time periods within one period of a carrier wave;

wherein said pulse-width modulated 3-phase a.c. power is synthesized through a polyphase multiple transformer having primary inputs connected to outputs of said plurality of 3-phase inverter main circuits;

instantaneous values of output line voltage of said polyphase multiple transformer corresponding to a peak value $|V^*|$ and phase $|\theta^*|$ of said desired instantaneous voltage vector to minimize step variations between instantaneous values of output line voltage when said instantaneous voltage vector varies.

2. A PWM controller according to claim 1, further comprising:

means for predetermining the variation of output voltage and the number of switching operations of said 3-phase inverter main circuits so as to minimize the switching frequency of each 3-phase inverter main circuit and to keep instantaneous variation of said output line voltage relatively small.

* * * * *

UNITED STATES PATENT AND TRADEMARK OFFICE
CERTIFICATE OF CORRECTION

PATENT NO. : 5,132,892
DATED : July 21, 1992
INVENTOR(S) : Shoji Mizoguchi

It is certified that error appears in the above-identified patent and that said Letters Patent is hereby corrected as shown below:

Col. 5, line 28 after "corresponds to" insert -- $\vec{\psi}$ --.

Col. 7, line 8 "$\vec{a}$, $\vec{b}$," should be --a, b,--.

Col. 7, line 30 "a" should be --$\vec{a}$--; "b" should be --$\vec{b}$--; "c" should be --$\vec{c}$--; "d" should be --$\vec{d}$--; and after the equation insert --(10)--.

Col. 7, lines 46-54 [eq. (12)] "a" should be --$\vec{a}$--; "b" should be --$\vec{b}$--; "c" should be --$\vec{c}$--; "d" should be --$\vec{d}$--.

Col. 8, line 50 "0)" should be --0--.

Col. 8, line 60 "similar" should be --Similar--.

Col. 12, line 15 (claim 1) "$|V^*_-|$" should be --$|V^*|$--.

Signed and Sealed this

Fourteenth Day of December, 1993

Attest:

BRUCE LEHMAN

*Attesting Officer*  *Commissioner of Patents and Trademarks*